May 3, 1960 R. V. REPPERT 2,935,250

COMBINED TYPEWRITING AND CALCULATING MACHINE

Filed May 5, 1954 4 Sheets-Sheet 1

RICHARD V. REPPERT
INVENTOR.

BY D. Clyde Jones

ATTORNEY

RICHARD V. REPPERT
INVENTOR.

BY D. Clyde Jones
ATTORNEY

May 3, 1960 R. V. REPPERT 2,935,250

COMBINED TYPEWRITING AND CALCULATING MACHINE

Filed May 5, 1954 4 Sheets-Sheet 3

RICHARD V. REPPERT
INVENTOR.

D. Clyde Jones
ATTORNEY

May 3, 1960 R. V. REPPERT 2,935,250

COMBINED TYPEWRITING AND CALCULATING MACHINE

Filed May 5, 1954 4 Sheets-Sheet 4

RICHARD V. REPPERT
INVENTOR.

BY D. Clyde Jones

ATTORNEY 2,935,250

COMBINED TYPEWRITING AND CALCULATING MACHINE

Richard V. Reppert, Rochester, N.Y.

Application May 5, 1954, Serial No. 427,752
15 Claims. (Cl. 235—59)

This invention relates to calculating machines and more particularly to a recording mechanism for such machines, and has as its foremost object the provision of typing devices comprising eleven type bars for typing the digits and the decimal point of a figure representing the product of a multiplication, said typing devices being under control of a read-out mechanism for the register dials of the calculating machine; and this mechanism functions to select the type bars in accordance with the product figure set up in the register.

A further object is the provision of means under control of the multiplicand and the multiplier key board of the calculating machine, whereby the operation of the keys will simultaneously index and type said factors, including their decimal points.

This invention is in the nature of an attachment or auxiliary mechanism for calculating machines, and is shown as applied to the calculating machine shown and described in my copending application, Serial No. 175,990, now Patent No. 2,702,159, granted February 15, 1955. Said machine is provided with a multiplicand and a multiplier key board, each having ten digit keys and a decimal point key, which are operable to set up a representation of a multiplicand and multiplier, including the decimal points of these factors. As described in detail in said application, the operation of these key boards for the purpose of setting up the multiplicand and multiplier, sets a decimal point indicator in the register dials in position to indicate the decimal point of the product figure shown in the dials, upon conclusion of a multiplying operation.

A read-out mechanism for the register of said machine is now provided, and in principle is similar to the one shown in the Patent No. 1,928,656, issued to me. It comprises means whereby each register gear, in each of the ten digit positions it assumes, is positioned to close a contact for a circuit for the type bar representing the respective digit. However, these circuits are normally held open, and are closed in succession by a decimal order circuit switch, starting with the circuit for the register gear of highest decimal order. Briefly stated, the read-out device comprises a contact member or brush, mounted in alignment with every tenth tooth of a gear meshed with a register dial; and one of these contact members is always positioned to be contacted by two contact bars, one being a decimal order bar representing the decimal order of the gear, and one a digit position bar, to thereby close a circuit for the digit-type bar magnet represented by the digit position of the register gear in the decimal order position of the decimal order bar.

The contact bars are shown as embedded in a non-conducting plastic body member, and this member is movable to bring the contact bars into contact with the contact members or brushes mounted on the register gears.

This invention includes means for reading out and typing the decimal point of the figure positioned in the register dials; and to accomplish this, the decimal point indicator that has been set in the register dials by the operation of the key boards, closes a contact for a circuit leading to the decimal point type bar. These circuits are under control of the aforesaid decimal order switch that closes these circuits as well as the digit circuits, in succession, from highest to lowest decimal order.

A figure representing the product may be a decimal quantity, such as .75030, or may have the decimal point located in any position between digits, such as 750.30. To meet the requirement of reading out and typing the decimal point in any position, the decimal order circuit switch is arranged to read out all possible decimal point positions in the product figure, in succession, starting with the decimal point position for a decimal quantity product, such as .75030, then read out and type the first digit "7," then the second decimal point position, in case the product figure is 7.5030, etc.

Figure 6:
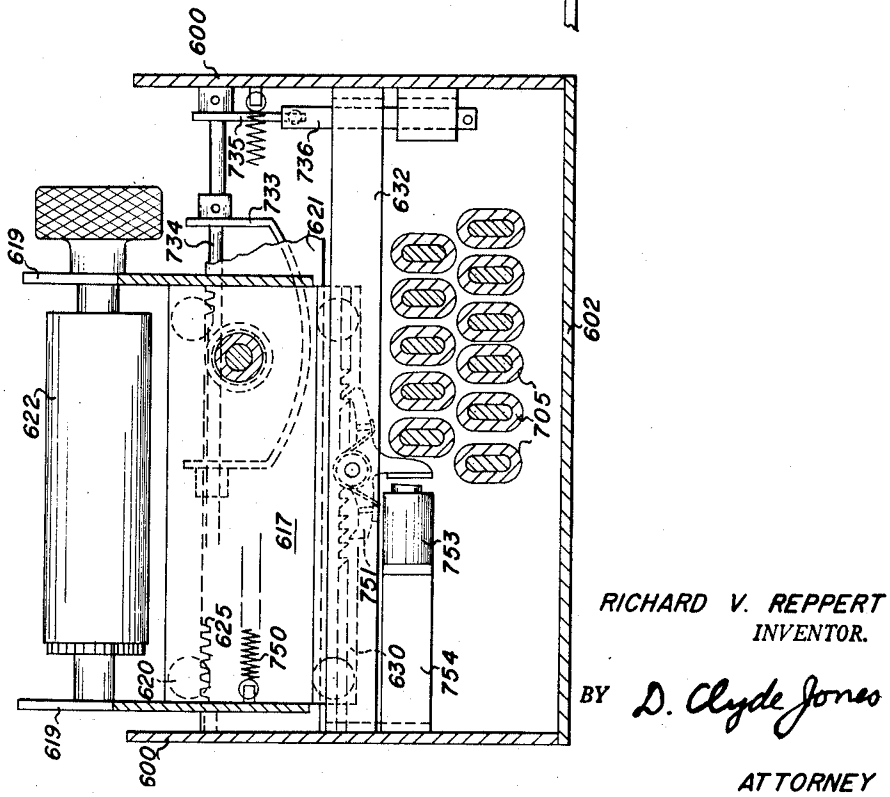
Fig. 6 is a sectional rear elevation through the typewriter unit, on the line 6—6 of Fig. 1.

A small typewriting unit is attached to the calculating machine and is housed in a frame consisting of the baseplate 602, the side plates 600, and a rear plate 607. See Figs. 1 and 6.

A typewriter carriage comprising a plate member 617 and side plates 619 is mounted, with rollers 620, on a transverse rail member 621, extending between the frame side plates. An escapement rack 630 (Fig. 6) mounted on the carriage plate 617 is engageable by an escapement pawl 757, mounted on a rail 632, and the pawl is operable by a magnet 753, to escape the carriage step by step, under tension of its spring 750. A small motor 628 (Fig. 1), mounted on the frame member 607, is geared to enage a rack 625, fastened to the carriage plate and serves to return the carriage to normal position after a typing operation. A platen 622 and a paper roll 623 are mounted in the carriage side plates, and conventional indexing means for the platen, as well as a suitable ribbon mechanism, are provided but not shown.

A type bar segment 609 is mounted on a transverse plate 608, extending between the frame side plates, and eleven type bars 627, representing the digits and the decimal point, are pivotally mounted therein. A linkage consisting of the members 610, 611, 612, and 613, connects each type bar with a solenoid plunger 614, and the solenoids 705 are mounted in two tiers on a plate fastened to the rear frame mmeber. A universal frame 733 is mounted on a shaft 734, journaled in the frame side plates, and receives a short movement near the end of each type bar stroke. A lever 735 mounted on the shaft 734 closes a contact 736 for every universal frame operation, and thereby closes the circuit for the magnet 753 which functions to induce a step movement of the carriage.

As described in said copending application, the multiplicand digit keys 1 are operable to close contacts 3 (Fig. 5) and thereby close circuits for the magnets 4 (Fig. 1), which function to set up the multiplicand in the multiplicand devices provided in the carriage 13; and the multiplicand decimal point key 33 (Fig. 5) is operable to set one of the multiplicand decimal point members 37 (Fig. 1), provided in said carriage, in position to indicate the decimal point of the multiplicand set up in the carriage. In setting up the decimal point member, as stated, the link 45 is operated by the decimal point key to move the decimal point member into operative relation with one of the members 50, which are operable to set a decimal point indicator for the register gears, into indicating position. See Fig. 1. For the purpose of simultaneously setting up and typing a multiplicand, the aforesaid contacts 3, under control of the keys, also close circuits, now provided, for the type bar solenoids 705 and induce typing of the multiplicand digits. For the purpose of typing the multiplicand decimal point, a cam 752 is provided on the aforesaid link 45, and upon operation of the decimal point key, closes a contact 749 and thereby closes the circuit for the decimal point type bar solenoid 705. See Fig. 5.

Figures 3, 4:
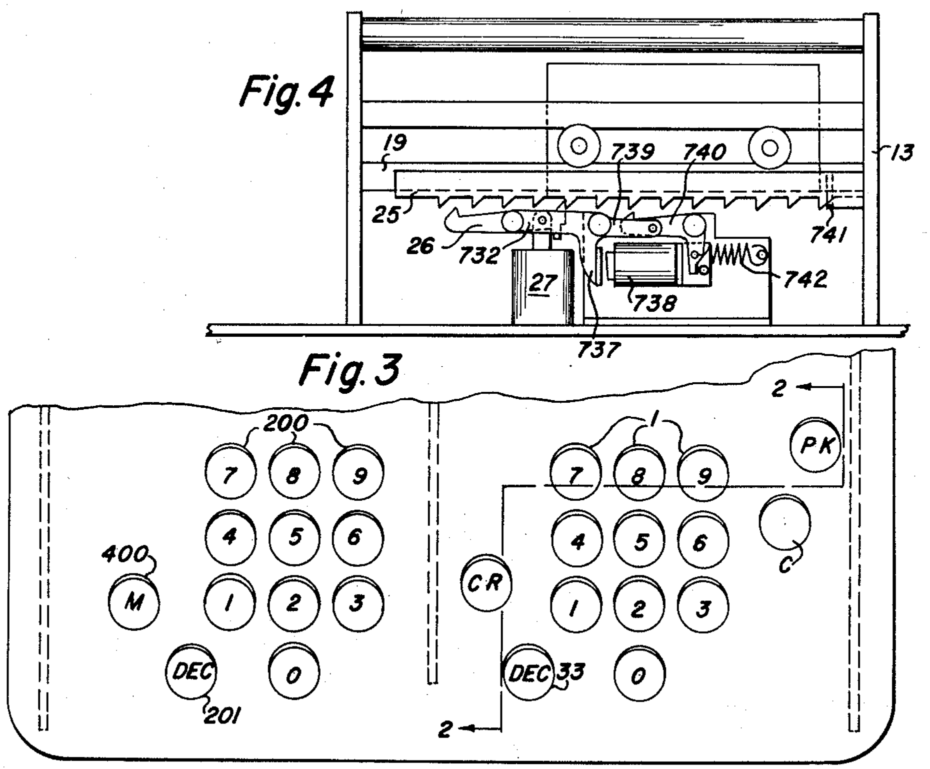
Fig. 3 is a plan view of the key board.
Fig. 4 is a front elevation of the multiplicand carriage.
Figure 8:
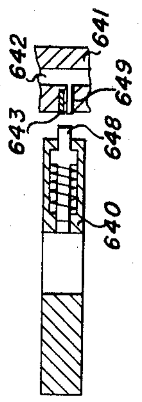
Fig. 8 is a detail of the read-out brush disc.

In said copending application, it is described how the operation of the multiplier digit keys 200 closes the contacts 199, to thereby close the circuits for the magnets, such as the magnets 240 shown in Fig. 4 of Patent No. 2,702,159, which operate the multiplier indexing mechanism to set up the digits representing the multiplier. For the purpose of simultaneously indexing and typing a multiplier, the contacts 199 also close circuits, now provided, for the type bar solenoids 705 and induce typing of the multiplier. For the purpose of typing the multiplier decimal point, the contact 272, closed by the operation of the multiplier decimal point key 201, also closes a circuit for the decimal point type bar solenoid 705. For the purpose of typing a total or product set up in the register gears, as a result of a multiplying calculation, a "read-out" device (Fig. 2) is provided and functions to read, or sense, by electrical contact means, the digit positions of the register gears and to induce the typing of these digits in the order in which they represent the product figure. A disc 640 of insulating material is attached to each register gear 647, and for each tenth tooth of the gear, a brush or contact member 648 (see Fig. 8) is yieldingly mounted in a recess in said disc and serves the purpose of establishing conductive connection between two contact members 643 and 649, see Figures 1, 2 and 5. Adjacent to the group of register gears is a segmental contact block 641 of insulating material, having a concave contour which is closely spaced from the path prescribed by the brushes attached to the register gears. In the present invention the gears 647 are shown as having 30 teeth and therefore the disc 640 carries three brushes 648. This provides that within an arc of 120 degrees, a brush may occupy any digit position from 0 to 9, and therefore the said contact block extends approximately 120 degrees. See Figs. 5 and 8. Inserted in said block is a series of longitudinal, or decimal order, contact members 643 which are in alignment with the brushes 648 attached to the gears and representing the decimal orders of the gears. Also inserted in said block is a series of transverse or digit contact members 642, which are in alignment with the digit positions assumed by the register gear brushes. These contact members have extensions 649 adjacent to each decimal order contact member, so that upon engaging movement of the contact block with the brushes, the brushes will contact the decimal order contacts and the adjacent extensions of the digit contact bars, and thereby establish conductive connection of the two sets of bars. Conductors extend from the members 642 to the type bar solenoids 705. See Figs. 2 and 3. To move the contact block 641 into engagement with the brushes 648, a key marked "P.K." is mounted on the keyboard and connects to a bell crank 669 which, upon operation by the key, moves the contact block into such engagement by means of the linkage comprising the links 668 and 645, the bell crank 670, and the lever 644 mounted on the shaft 671. The contact block is mounted on shaft 671 journaled in the register section side plates, and conductors 646 extend from a decimal order switch to the decimal order contact members 643 of the contact block.

The aforesaid P.K. key, upon operation, also closes a contact, which sends the line current to a decimal order switch conductor 723 (see Fig. 5), from where it will be conducted to the decimal order contact members on the contact block, in succession, from highest to lowest decimal order, as will be more fully described hereinafter.

The product total is entered into the register gears, commencing with the register gears of highest decimal orders. For this purpose, the multiplicand carriage is moved to align the first row of the multiplicand devices in the carriage, with the actuating devices for the second highest decimal order register gear, so that a transfer, or carry digit, will appear in the register gear of highest order. See Fig. 4. The escapement pawl 26 for the multiplicand carriage 13 is pivotally mounted on the arm 732 of the lever 737, which is actuatable by the magnet 738, to disengage the pawl from the rack 25 and let the carriage escape. The arm 739 of the lever 737 has a pin-and-slot connection with a stop pawl 740, and, upon operation of the magnet 738, this pawl is raised into position to intercept the carriage, by engaging the stop plate 741 mounted on the escapement rack.

Normally, the escapement pawl 26 is operable by the solenoid 27 (Fig. 4) to escape the carriage step by step, in the course of setting up a multiplicand, as described in said copending application. For the purpose of moving the carriage to its leftmost position, a key, marked "C.R." is provided on the keyboard and is operable to close a contact 752 for the magnet 738 which operates the lever 737 against the tension of the spring 742.

As stated, a decimal order switch is provided and is operable to close the decimal order circuits of the read-out device, in succession, from highest to lowest decimal order.

Furthermore, the decimal order switch also has provision to read out the decimal point of the product figure and induce typing of the decimal point.

Figure 1:
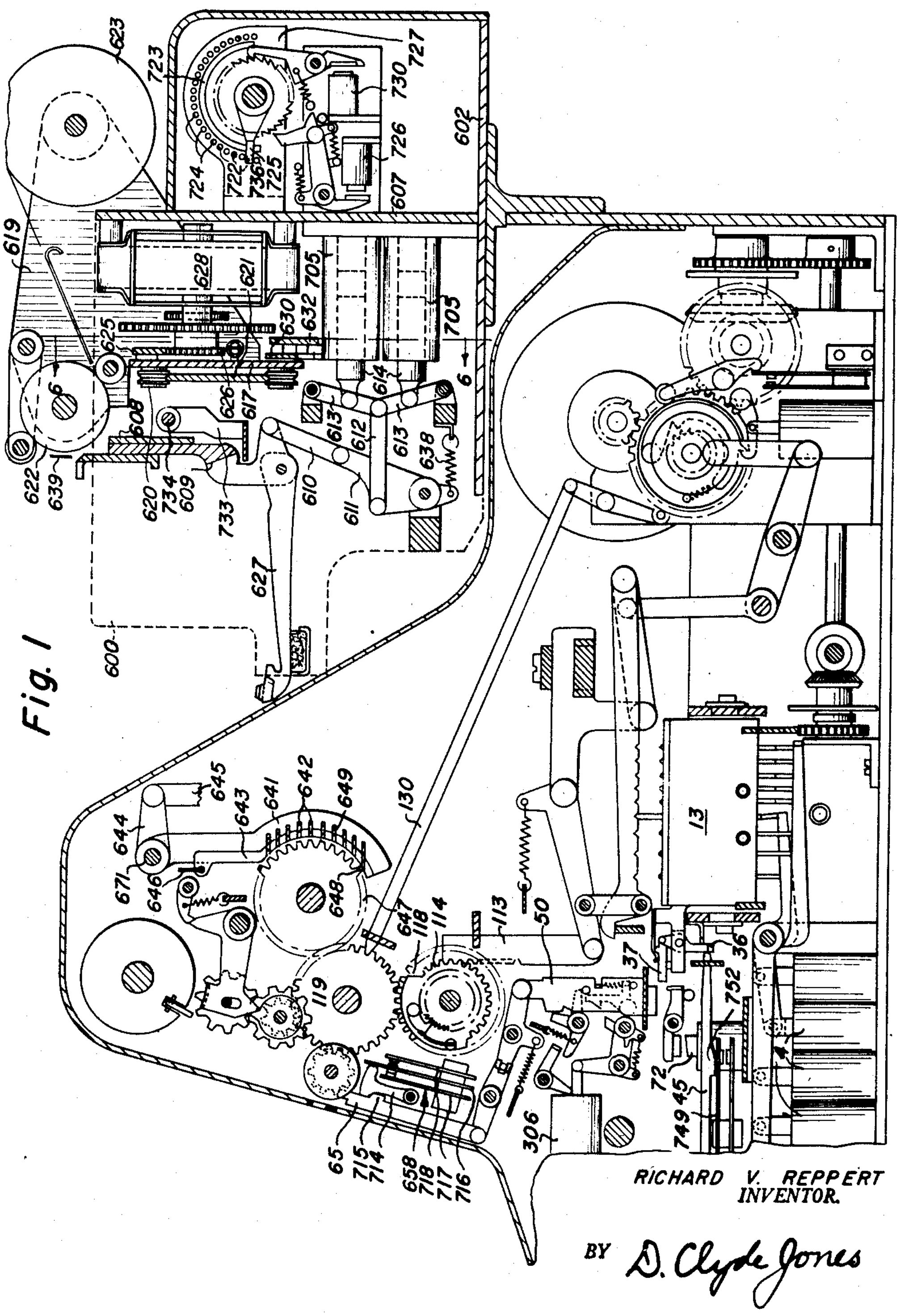
Fig. 1 is a longitudinal sectional elevation.
Figure 2:
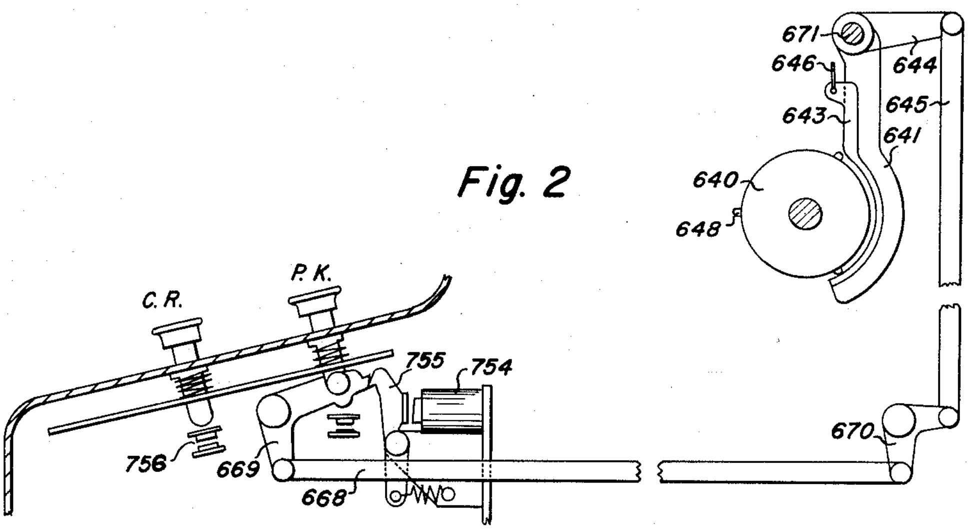
Fig. 2 is a sectional elevation on the line 2—2 of Fig. 3.
Figure 5:
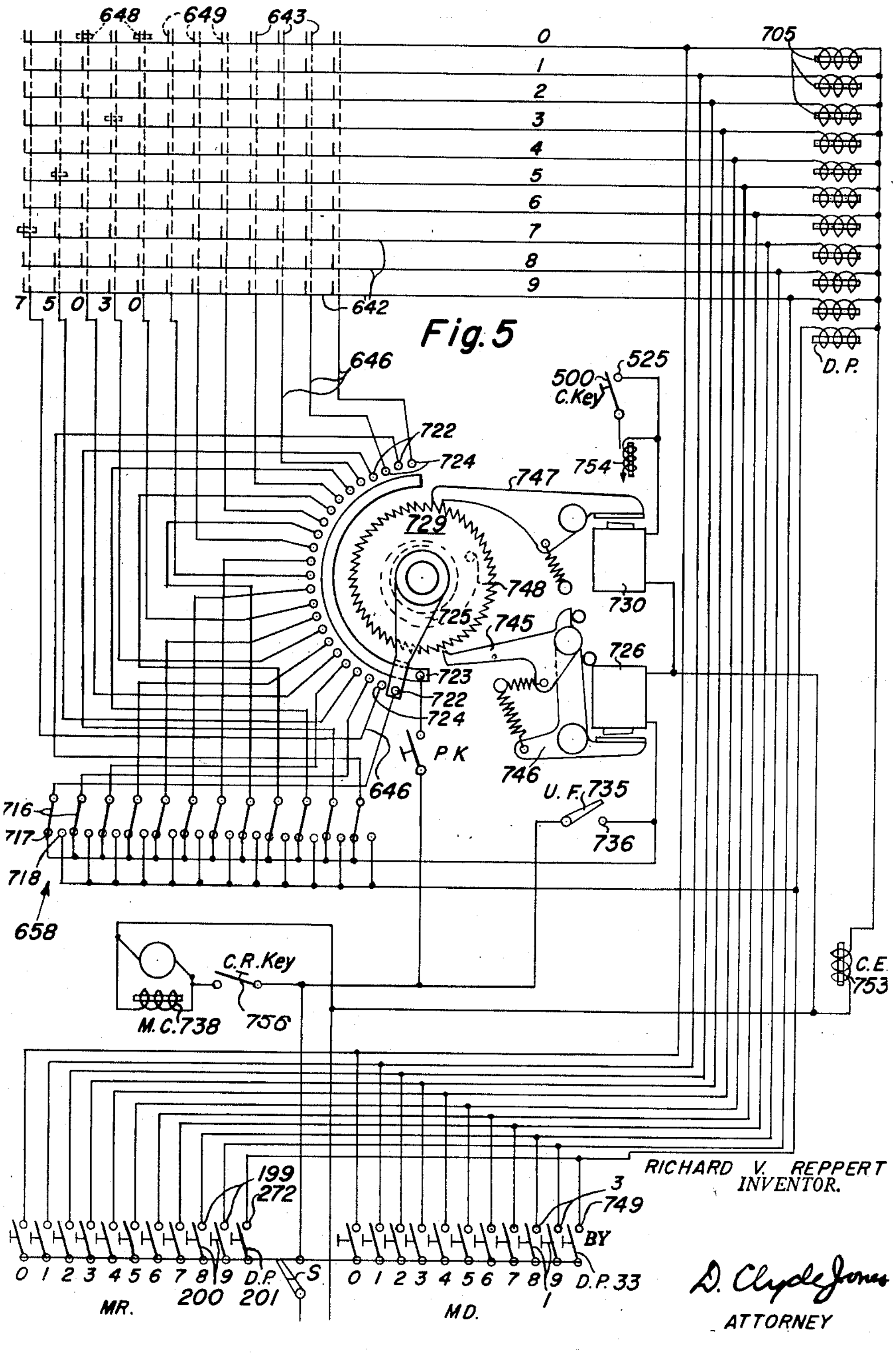
Fig. 5 is a partial circuit diagram, showing the circuits for the devices forming the subject matter of the present invention.
Figure 9:
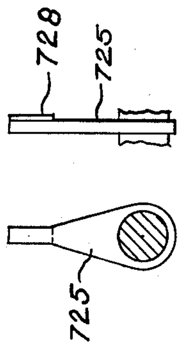
Fig. 9 is a detail of the contact arm 725 shown in side and front elevation respectively.
Figure 7:
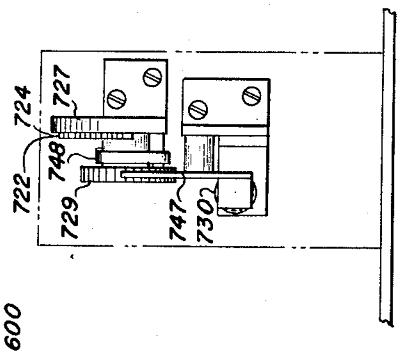
Fig. 7 is a rear view of the decimal order switch.

See Figs. 1, 5 and 7. A series of decimal order contacts 724 and a series of decimal point contacts 722 are mounted on a switch plate 727 of insulating material, and the two kinds of contacts are mounted in alternate sequence. See Figure 5. The contacts are mounted in arcuate arrangement, and a conducting rail 723 is mounted adjacent to the said contacts and receives the line current upon closing of the line contact by the P. key, which is operated to initiate typing of the product total. A contact arm 725, having a contact plate 728 (Fig. 9), adapted to make conductive connection of the conductor rail 723 with a contact 722 or 724, is rotatingly mounted on the switch plate 727, and is rotatable step by step, from contact to contact, by a ratchet wheel 729 attached thereto. A feed pawl 745, mounted on a lever 746, is operable to engage the ratchet wheel and operate it for a step movement by every operation of the magnet 726. The switch feed magnet 726 is operable by every operation of the type bar universal frame and also by every decimal point contact sensing on the decimal order switch. A detent 747 holds the ratchet wheel and contact arm in set position, against the tension of its resetting spring 748, and the detent is released by the operation of the magnet 730 which is energised upon operation of the clear key "C," at the termination of the typing operation.

As shown in Figure 5, the decimal order contact members 643 of the read-out block 641 are wired to the decimal order contacts 724 on the switch plate, in decimal order succession and in clockwise arrangement in Figs. 1 and 5, so that the switch contact arm will contact them in succession from highest to lowest decimal order.

As described in said copending application, the decimal point indicator plates 50 and the indicating members 65 connected thereto, are set to indicating position by the operation of the multiplier keyboard, to indicate the decimal point of the product. Means are provided to read out and type the decimal point of the product figure.

See Fig. 1. A contact assembly 658 is now provided for each indicator member 65, and, upon being set to indicating position, a cam 715 thereon will operate a lever 714 to open the contacts 716—717 and close the contacts 716—718.

The contacts 716 are wired to the aforesaid decimal point contacts on the switch plate, in decimal order succession, from highest to lowest order and in clockwise arrangement, as shown in Figs. 1 and 5, so that the switch contact arm will contact them in succession from highest to lowest decimal order.

The contact arm normally rests on the first decimal point contact on the switch plate, and this contact represents the decimal point position for the highest decimal order register gear, so that if the product figure set up in the register is a decimal quantity, the circuit is closed for the contact 718 and for the solenoid 705 which operates the decimal point type bar.

If the decimal point indicator for this register gear has not been set to indicating position, the contact 716 remains in contact with contact 717 and causes a contact arm step movement to the next contact on the switch plate, which connects with the highest decimal order readout contact and induces typing of the first digit of the product figure.

As shown in Figure 5, the contacts 718 are connected to a common lead extending to the solenoid 705 for the decimal point type bar, and the contacts 717 are connected to a common lead extending to the magnet 726, which operates the contact arm to move it one step.

As described in said copending application, the operation of the "C" key 500 induces resetting of the various devices of the calculating machine, to normal position, and now a circuit is provided, whereby the closing of the contact 525 by the said "C" key will operate a magnet 730, to release the ratchet wheel 729, so that it and the switch contact arm can be reset to normal position by the spring 748. Another circuit extends from the contact 525 to a magnet 754 (Fig. 6) which operates the lock lever 755 for the P.K. key, to release the key for resetting movement.

*Circuit diagram Fig. 5*

Upon the closing of the switch "S," the line extends to the two key boards "MD" and "MR," multiplicand and multiplier respectively. The operation of the keys 1 and 200 of these key boards, to set up a multiplicand and multiplier, closes the contacts 3 and 199 and induces operation of the type bar magnets 705 to type the respective factors and operation of the decimal point keys 33 and 201, induces typing of their decimal points. However, before the multiplier keys are operated, the C.R., or carriage return, key, is operated to reset the typewriter carriage, to line-space the platen, and to escape the multiplicand to its left-most position.

The "M" key is then operated to initiate multiplying operations, as described in said application, and then the P.K., or product key, is operated to cause reading out and typing of the product.

From the switch "S" the line extends to the product key P.K. and then to the arcuate conductor 723 of the decimal order circuit switch. The contact arm 725 of the switch is subject to step-by-step movement by the operation of the feed magnet 726 to thereby close the circuits for the contacts 722 and 724, in succession. These contacts represent respectively the decimal point positions and the decimal order positions of the register gears and the contact arm is normally positioned to close the circuit for the decimal point contact 722 for the first digit of the product figure.

From this contact, the line extends to the decimal point indicator contact 716 of highest decimal order, that is, the decimal point indicator for the first register gear.

These contacts have two positions: a normal one, "717," in which the line extends to the magnet 726 which operates the feed pawl for the contact arm of the decimal order switch, and a second position, "718," in which the line extends to the magnet 705 which operates the decimal point type bar.

In Figure 5, the contact 716 is shown in normal position, and therefore the contact arm of the decimal order switch will be moved one step, to the contact 724, which connects with the decimal order contact bar 643 for the register gear of highest decimal order.

The brushes for the digit positions of the register gears are schematically indicated by the small rectangles 648, and represent the figure 75030. When the switch contact arm is moved to the contact 724, the line extends through conductor 723, to the decimal order contact bar 643, and then through the register gear brush 648, to the contact bar 642 and the type bar magnet 705 for the digit "9" type bar. The operation of a type bar operates the universal frame in the usual manner, and this causes a step escapement of the typewriter carriage by the operation of the magnet C.E. and a momentary closing of the contact 736, to thereby operate the feed magnet 726 and move the switch contact arm to the next contact 722. This contact connects to the second decimal point indicator contact 658 and, according to the position of this contact, will cause either another step movement of the switch contact arm or the typing of a decimal point. In the described manner, the decimal order switch is operated to read out and type the figure set up in the register gears.

What I claim is:

1. In a calculating machine having ordinal register gears, ordinal decimal point indicators for the register gears settable to indicate the decimal point of a product established in the register, movable, multicyclically operable actuators for the register gears, multiplicand devices settable to select the actuators for operation and to control the extent of their movement, multiplier devices settable to control the multicyclic operation of the actuators, digit keys to set the multiplicand and the multiplier devices, and multiplicand and multiplier decimal point keys, said keys being operable to set the decimal point indicators for the register gears upon operation in their proper sequence when the digit keys are operated, the combination of typing devices comprising digit type bars and a decimal point type bar, and means under control of the digit keys and of the decimal point keys, when operated to set their respective devices, to thereby cause typing of the multiplicand and multiplier and their respective decimal points.

2. In a calculating machine having register gears, actuating devices for the gears, multiplicand and multiplier devices to control the operation of the actuating devices comprising digit keys and multiplicand and multiplier decimal keys, and ordinal decimal point indicators for the register gears, selectively settable by the operation of the multiplicand decimal point key and the multiplier decimal point key to indicate the decimal point of a product established in the register gears, the combination of a readout device for the digit positions, an ordinal readout means for the register gears, digit position indicating means associated with the register gears adapted to be brought into register with said readout device for the digit positions and with said ordinal readout means for the register gears, typing devices comprising digit type bars and a decimal point type bar, means for operating said type bars, a step by step operable distributor switch having a series of digit contacts and a series of decimal point contacts, the digit contacts alternating with the decimal point contacts and being connected to said readout devices and operable to induce operation of the digit type bars, said decimal point contacts being connected to the decimal point indicators for the registers and being connectable to said decimal point type bar, means for operating said distributor switch in the ordinal register gear sequence and to contact the decimal point indicator contacts and the digit contacts in ordinal sequence and cause typing of the decimal point when the switch contacts the selected decimal point contact.

3. In a calculating machine as claimed in claim 2, a contact assembly for each decimal point indicator comprising two contacts and a movable center blade connected to the decimal point indicator contacts on the distributor switch and settable by the setting operation of an indicator to open a first contact and close a second contact, said distributor switch comprising a contact arm, a magnet operable to impart step movement to said contact arm to move said arm step by step, a circuit extending from the first contact of each contact assembly to said magnet, to cause a step movement of the contact arm when the arm is positioned on a decimal point indicator contact to thereby move the arm to the adjacent digit contact, means for operating said digit type bars comprising operating magnets, means for operating said decimal point type bars comprising a decimal point typing magnet, a circuit extending from the second contact of each contact assembly, when closed by the center blade of the assembly, to a decimal point typing magnet, and a universal bail frame operable by any type bar to close a contact and extend a circuit to the first-named magnet for the distributor switch contact arm to cause a step movement thereof to the adjacent digit contact.

4. In a calculating machine having register gears, individual decimal point indicators for the register gears, actuators for the register gears, multiplicand devices operable to control the selection of the actuators for operation and to control the extent of their movement, comprising a carriage with multiplicand members settable to represent a multiplicand factor, multiplier devices operable to control the multicyclic operation of the actuators and comprising multiplier members settable to represent a multiplier factor, said multiplicand and said multiplier devices comprising digit keys and decimal point keys to set a representation of a multiplicand and a multiplier factor and concurrently therewith set a decimal point indicator for the register gears; the combination of typing devices operable by said calculating machine keys to type the multiplicand and multiplier factor concurrently with the operation of said keys when operated to set the multiplicand and multiplier factors.

5. In a calculating machine having register gears, individual decimal point indicators for the register gears, actuators for the register gears, multiplicand devices to control the selection and operation of the actuators and comprising a carriage with multiplicand and decimal point members in the carriage, settable to represent a multiplicand and the decimal point of the multiplicand, digit keys and a decimal point key operable to set the said members and to move the carriage to position the multiplicand members into operative relation with the actuators and move the decimal point member into operative relation with the decimal point indicator of the register, multiplier devices to control the multicyclic operation of the actuators and comprising multiplier members settable to represent a multiplier, and multiplier digit keys to set the multiplier devices; the combination of typing devices and means under control of the multiplier digit keys, when operated to set the multiplier members, to set the decimal point indicator for the register gears and concurrently to operate the typing devices to type the multiplier factor.

6. In a calculating machine having register gears, individual decimal point indicators for the register gears, settable to establish decimal orders for the gears, actuators for the register gears, multiplicand and multiplier devices to control the operation of the actuators and comprising digit keys and decimal point keys, typing devices operable to type the factors and the products, read-out means for the register gears comprising devices operable to read out and type the digit positions of the register gears in ordinal sequence; the combination of ordinal decimal point read-out means, settable to read out and type the decimal points of the product figures, and means under control of said keys effective, when operated to index the multiplicand and multiplier factors, to concurrently therewith set the ordinal read-out means in position for reading out and typing the decimal points of the product figures in their proper sequence.

7. In a calculating machine having multiplying devices, registering means operable by the multiplying devices to register the product of a multiplication, decimal point devices for the registering means settable to establish a decimal point for the product total, digit keys operable to set up multiplicand and multiplier factors, actuating means for the multiplying devices under control of said digit keys, decimal point keys operable to set the decimal point devices for the registering means; the combination of typing devices comprising digit type bars, and means operable by said digit keys, when operated to set up a multiplicand or a multiplier factor, to cause typing of the multiplicand or multiplier digits and the decimal point simultaneously with said setting up operations.

8. In a calculating machine adapted for multiplication and having product registering means, multiplicand devices to control the registering means and comprising multiplicand members settable to represent a multiplicand and its decimal point, digit keys and a decimal point key operable to set the multiplicand members; the combination of typing devices comprising digit type bars and a decimal point type bar, electrical circuits extending from said digit and decimal point keys to the individual corresponding type bars, respectively, and contacts closable by the operation of said keys, when operated to set the multiplicand members, to close the circuits to the type bars and type the multiplicand, including its decimal point.

9. In a calculating machine adapted for multiplication and having product registering means, multiplier devices to control the registering means and comprising multiplier members settable to represent a multiplier and its decimal point, digit keys and a decimal point key operable to set the multiplier members; the combination of typing devices comprising digit type bars and a decimal point type bar, an electric circuit extending from each key to the corresponding type bar, and contacts closable by the operation of said keys, when operated to set the multiplier members, to close the circuits to the type bars and type the multiplier, including its decimal point.

10. In a calculating machine adapted for multiplication and having product registering means, multiplicand and multiplier devices to control the operation of the registering means and comprising members settable to represent the multiplicand and multiplier including their decimal points, digit keys and a multiplicand and multiplier decimal point key operable to set the said members; the combination of typing devices comprising digit type bars and a decimal point type bar, electric circuits extending from the respective keys to the corresponding type bars, and contacts closable by the operation of said keys, when operated to set the multiplicand and multiplier members, to close direct circuits to the type bars, and to type the multiplicand and multiplier, including their decimal points.

11. In a calculating machine adapted for multiplication and having a register with a series of members settable to represent a product, decimal point devices for the members settable to determine the decimal point position of a product set up in the members, multiplier devices to control the operation of the register and comprising members settable to represent a multiplier and its decimal point, digit keys and a decimal point key operable to set the multiplier members; the combination of typing devices comprising digit type bars and a decimal point type bar, electric circuits extending from the respective keys to the corresponding type bars, and contacts closable by the keys, when operated to set the multiplier member, to set the decimal point device and to close the circuits to the type bars to type the multiplier including the decimal point.

12. In a calculating machine adapted for multiplication and having a register with a series of members settable to represent a product, decimal point devices for the members settable to determine the decimal point position of a product set up in the members, multiplicand and multiplier devices to control the operation of the register and comprising multiplicand and multiplier members settable to represent these factors and their decimal points, digit keys and decimal point keys operable to set the factor members; the combination of typing devices comprising digit type bars and a decimal point type bar, electric circuits extending from the respective keys to the corresponding type bars, and contacts closable by the keys, when operated to set the multiplicand and multiplier members, to operate the decimal point device for the register and to close the circuits to the type bars to type the factors including their decimal points.

13. In a calculating machine adapted for multiplication and having a register with ordinal members settable to represent the digits of a product, ordinal decimal point indicating means for the register members selectively settable to indicate the decimal point position of a product set up in the register, multiplicand and multiplier devices to control the setting of the register members, digit keys and a multiplicand and multiplier decimal point key operable to set the register members and simultaneously therewith to select and set the decimal point indicating means; the combination of typing devices comprising digit type bars and a decimal point type bar, electrical circuits extending from the respective keys to the corresponding type bars, and contacts closable by the operation of said keys, when operated to set the multiplicand and multiplier members and to set the decimal point indicator, to establish direct circuits to the type bars to type the multiplicand and multiplier including their decimal points.

14. In a calculating machine adapted for multiplication and having a product register comprising ordinal members settable to represent the digits of a product, multiplicand and multiplier devices to control the operation of the register and comprising members settable to represent a multiplicand and multiplier factor, digit keys and a multiplicand and multiplier decimal point key operate to set the multiplicand and multiplier members, typing devices comprising digit type bars and a decimal point type bar, read-out means operable to read out the digit positions of the register members in ordinal sequence and to operate the typing devices to type the digits; the combination of ordinal decimal point devices for the register members selectively settable to a read-out position in which a set device establishes the decimal point in the register, means operable by the aforesaid keys, when operated to set the multiplicand and multiplier members, to select and set a decimal point device to read-out position, read-out means for the decimal point devices operable to read the devices in ordinal sequence and to read-out the device that has been set to read-out position and to operate the decimal point type bar, the read-out device for the register members and the read-out device for the decimal point devices being functionally coordinated to read the decimal point devices and the digit positions, alternately, starting with the decimal point device of highest order and proceeding in ordinal sequence until the last decimal point device has been read.

15. In a calculating machine adapted for multiplication and having a product register, comprising ordinal members settable to represent the digits of a product, multiplicand and multiplier devices to control the operation of the register and comprising members settable to represent a multiplicand and a multiplier factor, ordinal decimal point indicators for the register members selectively settable to visually indicate the decimal point of the product set up in the register, digit keys and a multiplicand and multiplier decimal point key operable to set the multiplicand and multiplier members and by this operation to select and set the decimal point indicator for the register members, typing devices comprising digit type bars and a decimal point type bar, read-out means for the register members operable to read-out the digit positions of these members in ordinal sequence and to cause typing of the digits; the combination of ordinal decimal point devices for the register members, selectively settable to a read-out position in which a set device establishes the decimal point of a product set up in the members, means operable by the aforesaid keys, when operated, to set the multiplicand and multiplier members, to set a decimal point device to read-out position, read-out means for the decimal point devices operable to read the devices in ordinal sequence and to read out the device that has been set to read-out position and to operate the decimal point type bar, the read-out means for the digit positions of the register members and the read-out means for the decimal point devices being functionally coordinated to read the decimal point devices and the digit positions alternately, starting with the decimal point device of highest order and proceeding in ordinal sequence until the last decimal point device is read.

References Cited in the file of this patent

UNITED STATES PATENTS

| | | |
|---|---|---|
| 1,302,250 | Von Reppert | Apr. 29, 1919 |
| 1,371,138 | Bair | Mar. 8, 1921 |
| 1,829,233 | Morss et al. | Oct. 27, 1931 |
| 1,911,515 | Koronski | May 30, 1933 |
| 1,928,656 | Von Reppert | Oct. 3, 1933 |
| 2,062,963 | Benninger | Dec. 1, 1936 |
| 2,344,885 | Kozma et al. | Mar. 21, 1944 |
| 2,365,527 | Dennis | Dec. 19, 1944 |
| 2,403,005 | Lake et al. | July 2, 1946 |
| 2,702,159 | Von Reppert | Feb. 15, 1955 |
| 2,717,733 | Luhn et al. | Sept. 13, 1955 |
| 2,728,521 | Benson et al. | Dec. 27, 1955 |